Feb. 9, 1926.                                                                     1,572,307
                              W. D. NOTTINGHAM
                    DEVICE FOR HOLDING PIGS AND LIKE ANIMALS
                        Filed Dec. 23, 1924        2 Sheets-Sheet 2
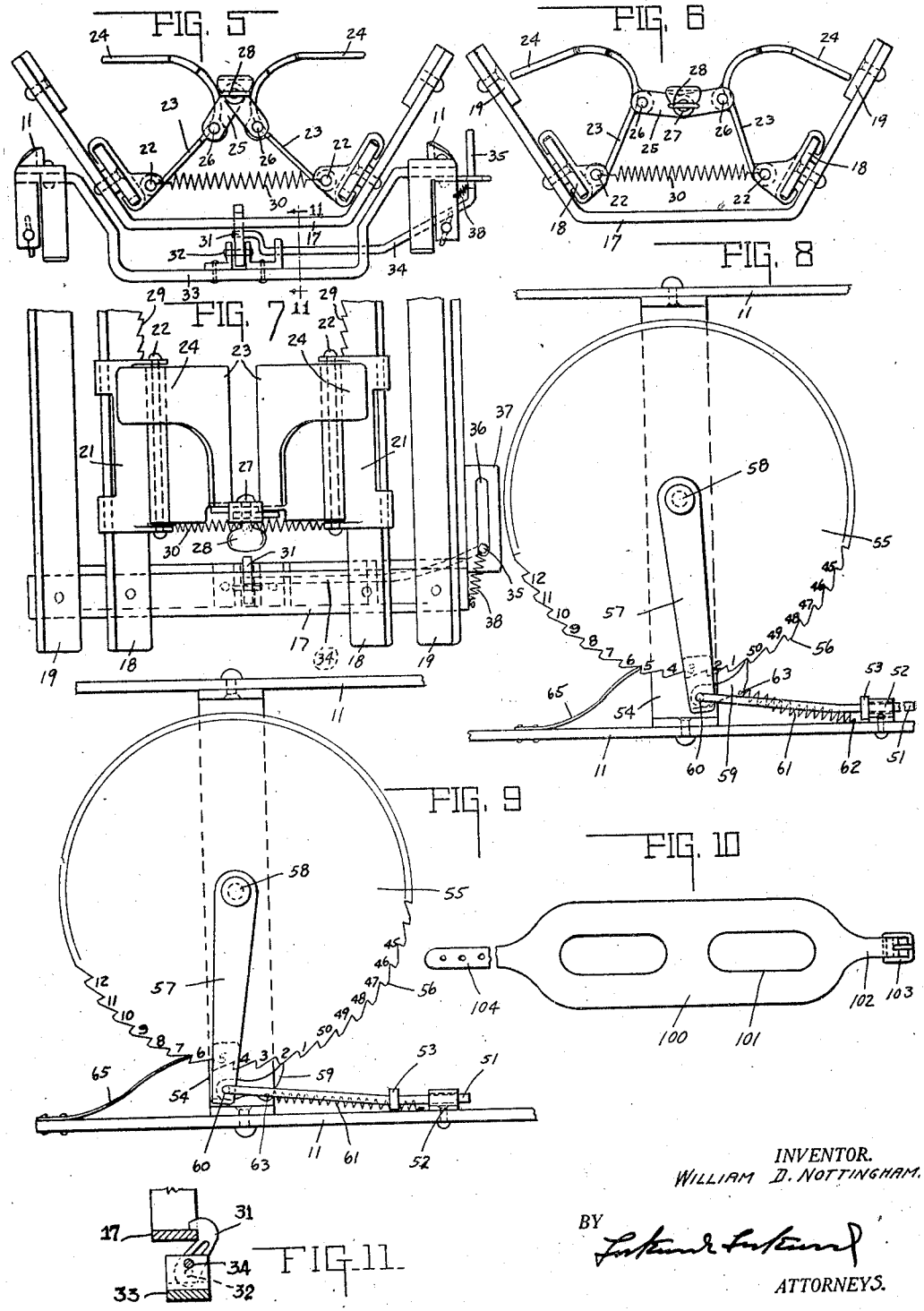
INVENTOR.
WILLIAM D. NOTTINGHAM.
BY
ATTORNEYS.

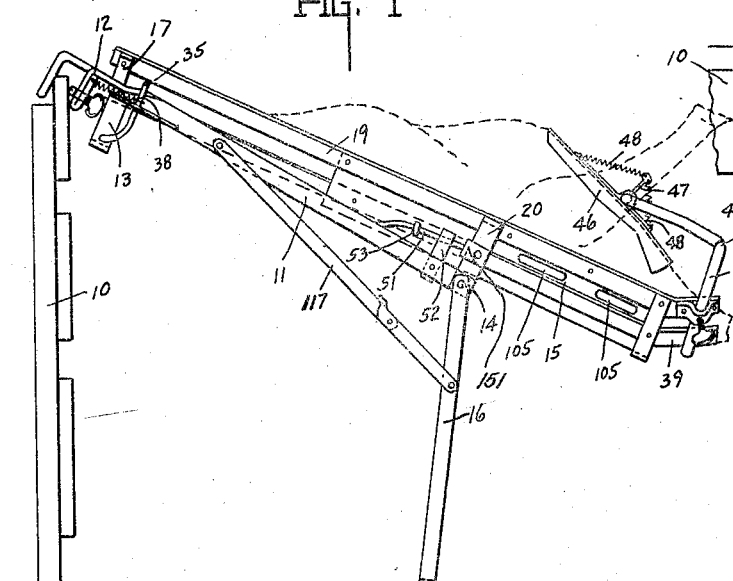

Patented Feb. 9, 1926.

1,572,307

UNITED STATES PATENT OFFICE.

WILLIAM D. NOTTINGHAM, OF FOWLERTON, INDIANA.

DEVICE FOR HOLDING PIGS AND LIKE ANIMALS.

Application filed December 23, 1924. Serial No. 757,643.

*To all whom it may concern:*

Be it known that I, WILLIAM D. NOTTINGHAM, a citizen of the United States, and a resident of Fowlerton, county of Grant, and State of Indiana, have invented a certain new and useful Device for Holding Pigs and like Animals; and I do hereby declare that the following is a full, clear, and exact description thereof, reference being had to the accompanying drawings, in which like numerals refer to like parts.

This invention relates to an operating construction for holding animals such as pigs and hogs inactive for operations such as ringing, vaccinating, surgical work and the like.

The chief object of the invention is to construct an operating table or construction which is adapted to receive and hold an animal firmly during the operative period and thereafter position the animal upon the ground and substantially upon its feet prior to its release from the table.

Another object of the invention is to arrange the parts whereby they may be readily collapsed into small volume so as to be readily transportable by the veterinarian or hog raisers.

Another object of the invention is to provide the table of the before mentioned general description with a registering device for registering the number of animals operated upon.

The chief feature of the invention consists in the relative adjustability of the breast or clamping plate construction.

A further feature of the invention consists in the adjustability of the hind leg clamping construction, that is, it is adjustable with reference to the remainder of the construction whereby the clamping means may be adjusted to the length of the animal.

Another feature of the invention consists in the method of retaining the device in operative position, while a further feature of the invention consists in the provision of means for maintaining the hind leg retaining construction in the adjusted position when a part of the device is moved into animal releasing position.

The full nature of the invention will be understood from the accompanying drawings and the following description and claims:

In the drawings Fig. 1 is a side elevational view of a support and the invention supported thereby and in the operating position. Fig. 2 is a front elevational view of the same parts. Fig. 3 is a top plan view of the same parts. Fig. 4 is a side elevational view of the same parts but showing a portion thereof in the animal releasing position. Fig. 5 is an enlarged rear elevational view of the hind leg clamping construction with the parts in the receiving position. Fig. 6 is a similar view of the same parts in the leg clamping position. Fig. 7 is a top plan view of the parts as shown in Fig. 5. Fig. 8 is a top plan view of the registering mechanism associated with the animal support and indicates the parts in the non-registering position. Fig. 9 is a view similar to Fig. 8 and of the same parts but in a position immediately prior to registering the release of an animal from the construction. Fig. 10 is a plan view of a modified view of an animal clamp. Fig. 11 is a sectional view of the latching mechanism.

In the drawings 10 indicates a suitable support such as a fence or the like and there is provided a rectangular frame 11, which at its upper edge includes a clamping construction indicated generally by the numeral 12, and a latch construction indicated generally by the numeral 13. Pivotally supported at the opposite end and upon the pivot 14 is a cradle 15. Also pivotally supported upon the rectangular framework 11 and herein on the same pivot 14 is a standard or frame support 16. Connecting the framework 11 and the standard or support 16 is a folding rule linkage 117. From the foregoing general description it will be understood that the cradle indicated by the numeral 15 is tiltably supported upon a relatively rigid support consisting of the stationary support 10, the framework 11 and the standards 16 held in rigid relationship by the clamp 12 and the folding rule joint linkage 117. It will be obvious, therefore, that when the clamp 12 is released the folding rule joint is broken and the standards 16 collapsed into position lying adjacent the framework 11, the before mentioned construction occupies but little volume and, therefore, can be readily transported by the veterinarian or hog raiser.

The cradle indicated generally by the numeral 15 consists of a truncated V-shaped transverse member 17, to which are added two parallel pairs of bars 18 and 19, thereby defining a channel or trough. An intermediate member 20 suitably supports said elongated bars 18 and 19 and the same likewise are connected at their other end by means hereinafter to be described.

As shown clearly in Figs. 2, 3, 5, 6 and 7, a pair of clamping constructions 21 are slidably supported upon the bars 18, and said clamping constructions include a hinge joint 22 upon which is hingedly mounted a link in the form of a plate 23. The plates 23 extend inwardly and upwardly toward each other and thence curve upwardly and outwardly and have the extensions 24 which are reduced from the plates 23. A pair of links 25 are pivotally connected at 26 to the plates 23, and are connected together at 27, thereby forming a toggle construction, the same being actuatable by the finger piece 28, an extension of the pivot 27. It will be understood from an examination of Figs. 5 and 6 that when the plates 23 are in the position shown in Fig. 5 the animal's hind legs can be positioned one at each side of the plates and associated linkage and in the trough formed by the bars 18 and 19, and when the finger piece 28 is depressed overcenter the plates together with the extensions 24 move outwardly towards the inner sides of the trough and thereupon securely anchor the hind legs of the animal to the trough, such anchorage being automatic thereafter because of the over-center or toggle construction employed.

In order to adjust the hind leg clamping construction for the length of the animal, the inner and adjacent edges of the bars 18 are notched as at 29 for toothed engagement by the slides 21 slidably supported upon said bars. When the animal is released from the operating device herein described, by tilting of the cradle, the slides 21 tend to move toward the head of the cradle but are restrained by the spring 30 joining the two pivots 22. The foregoing spring tends to transform the slides into clamps and thus hold the hind leg clamping construction in the adjusted position during the releasing movement and yet permit forcible movement longitudinally of said bars 18 when desired.

Also associated with the upper and rear end of the cradle is a catch in the form of a pivoted tooth 31 pivotally supported at 32 upon its transverse frame member 33 provided at the upper end of the framework 11. An actuating member 34 is associated with said locking tooth 31 and terminates in a handle portion 35 slidably supported in a slot 36 in a plate 37 carried to one side of and near the upper end of and by the framework 11. Spring 38 normally maintains the upper end of the handle portion 35 in the upper end of the slot and thus maintains the actuating member or rod 34 in the cradle locking position. When it is desired to release the cradle and tilt the same upon the framework, handle 35 is actuated in opposition to spring 38 which tilts tooth 31 out of locking engagement with said cradle and permits the cradle to be tilted upon its pivot 14 as shown clearly in Figs. 1 and 4.

The lower and head end of the cradle 15 includes a member 40 substantially similar to the member 17, and the free ends of the bars 18 and 19 extend inwardly and upwardly as shown clearly at 39 in Figs. 1 and 2. One or both of said bars, and herein the bar 19, is provided at said upward and angular extension with a clamping socket 41 having the clamping member 42 therein. This receives one end 43 of a U-shaped member 44 upon the mid-portion of which 45 there is pivotally supported a plate or breast clamping member 46. A member 47 (see Fig. 1) extends upwardly from the U-shaped portion 45 and to the same is secured a pair of springs 48, which are secured at adjacent ends to said upright 47 and at opposite ends to the breast clamping plate 46. As shown clearly in Figs. 2 and 3, the U-shaped member 44 intermediate the ends is offset as at 49, and between said offset portions and the angular extensions 39 of the bars 18 and 19, there is formed a pocket in which the head of the animal is receivable and beyond which the snout of the animal projects.

When the animal is positioned so that the plate 46 bears upon the breast of the animal and the head projects through the U-shaped member 44 and angular ends 39 and the hind legs are clamped by the clamping construction previously described, the animal is rigidly secured in position for the desired operation. Vaccine, therefore, may be injected at any desired part of the body and in the case of pigs the snout may be provided with a ring and other operations upon the animal may take place without danger of the animal moving and interfering with the work. When the desired operation is completed, the handle 35 is actuated which unlocks the cradle and the cradle thereupon is manually tilted into the position shown in Fig. 4, which turns the animal right side up with its hind legs resting upon the ground. Thereupon the breast plate 44 is released and the animal is released.

The cradle construction, as shown clearly in the several figures, is suitably sheathed as at 50 so that the animal will not become injured but said sheathing may be omitted if desired without departing from the invention.

The member 20 carried by the cradle 15 is adapted to engage a slidable member 51 slidably supported by a strap 52. Herein a lug 151 is an abuttable member. The slidable member 51 carries a stop 53 adapted to engage said strap 52 and limit movement of said slidable member in the return direction.

Reference will now be had to Figs. 8 and 9 wherein the detail construction of the mechanism operated by said slidable member is illustrated in detail. Extending across the framework 11 is a supporting member 54, and pivotally supported thereby is a ratchet wheel 55, having the teeth 56 thereon. An arm 57 is also pivotally supported at 58 upon said transverse support 54 and pivotally supports a dog 59 whose toothed portion is adapted to engage the ratchet toothed surface of the wheel 55. The opposite end of the slidable member 51 is pivotally connected at 60 to the end of the lever 57 and this pivot is formed by turning said rod angularly and mounting thereon the dog or detent 59. A spring 61 is connected to the framework at 62 and to the dog 59 at 63. Thus the spring tends to maintain the lever 57 in the position shown in Fig. 8 and also maintains tooth 59 in engagement with the ratchet tooth 56. When the cradle 15 is tilted upwardly member 151 engages the free end of the rod 51 which moves the lever 57 upon its pivot as shown in Fig. 9, thereby retracting dog 59 from the tooth 56 as shown. Upon the release of the slide rod 51 by the tilting of the cradle to release the animal from said cradle, spring 61 returns the slidable member 51 to the position shown in Fig. 8 which thereupon through the dog 59 rotates the ratchet wheel 55 one tooth distance. To insure rotation of the wheel only to the desired degree, a friction spring or brake 65 is provided.

While the invention has been described in considerable detail in the foregoing specification, it is to be understood that such description is illustrative and not restricted to character, for any suitable clamping constructon may be utilized for the clamping plate. Likewise any suitable standard or support may be utilized in place of the standard and clamping construction, and furthermore any suitable means for the hind leg clamping construction may be substituted for that herein described broad combination, reference being had to the appended claims. In Fig. 10 such a substitute form of clamp is disclosed. In this form of the invention the band 100 is apertured as at 101 and said band includes the buckle supporting portion 102 carrying the buckle 103 and the perforated tongue portion 104. It is to be understood that, see Figs. 1, 2 and 4, the band is passed through either pair of openings 105 with the apertured portions extending across the trough. The respective pair of openings utilized will depend upon the size of the animal the fore paws of which are passed through the openings 101. The tongue and buckle 103—104 are then passed beneath the cradle 15 and securely anchored or clamp the animal adjacent the shoulder and maintain the fore paws in predetermined position.

The invention claimed is:

1. In an animal retainer of the character described the combination of a support, a pair of leg clamping members pivotally supported thereby, and a single means for moving simultaneously said leg clamping members into clamping relation with and adjacent the support.

2. In an animal retainer of the character described the combination of a support, a pair of leg clamping members pivotally supported thereby, and toggle means for moving simultaneously said leg clamping members into clamping relation with and adjacent the support.

3. The combination of a framework having a pair of spaced supports adapted to bear upon a base and straddle or receive an animal standing in natural position, an animal receiving cradle pivotally supported by said support and arranged to over-lie the animal when in straddled relation, and a clamping plate carried by said cradle adapted to under-lie the fore part of the animal, said cradle, plate and animal being movable into inverted position upon said framework.

In witness whereof, I have hereunto affixed my signature.

WILLIAM D. NOTTINGHAM.